United States Patent [19]

Poncy

[11] Patent Number: 4,614,442
[45] Date of Patent: Sep. 30, 1986

[54] THERMOMETER SHEATH PACKAGE FOR ELECTRONIC THERMOMETERS

[76] Inventor: George W. Poncy, 9725 Investment La., Rivera Beach, Fla. 33404

[21] Appl. No.: 692,697

[22] Filed: Jan. 18, 1985

[51] Int. Cl.⁴ ............................................. G01K 1/08
[52] U.S. Cl. ................................. 374/158; 374/209; 206/306
[58] Field of Search ................. 374/158, 209; 206/306

[56] References Cited

U.S. PATENT DOCUMENTS

| | | | |
|---|---|---|---|
| 3,552,558 | 1/1971 | Poncy | 206/63.2 |
| 3,712,141 | 1/1973 | Chadha et al. | 374/159 |
| 3,732,975 | 5/1973 | Poncy | 206/63.2 |
| 3,880,282 | 4/1975 | Naumann | 374/209 |
| 4,051,950 | 10/1977 | Jarund | 206/306 |
| 4,136,776 | 1/1979 | Poncy | 206/306 |
| 4,165,000 | 8/1979 | Poncy | 206/306 |

Primary Examiner—Charles Frankfort
Assistant Examiner—Thomas B. Will
Attorney, Agent, or Firm—Lane and Aitken

[57] ABSTRACT

In a thermometer sheath package, for electronic clinical thermometers, two strips of thermoplastic material are sandwiched between two coated paper cover strips all joined together along a seal line in the shape of a sheath for the probe of the thermometer. The inner two strips are joined together along the seal line by a tear seal to define the sheath for the thermometer probe. The cover strips are joined to the inner strips along the seal line by peelable seals. Perforated lines are defined across the width of the cover strips near the mouth of the sheath to define tabs in the cover strips at the mouth of the sheath. The tabs of the cover strips are sealed to the inner strips in broad flat seals across the width of the cover strips. The seal line defining the sheath and along which all four strips are sealed together extends past the perforated lines and into the area of the broad flat seals. When the sheath is used and an electronic thermometer probe is inserted into the sheath, the portion of the seal line extending past the perforated lines and into the tabs of the cover strips, holds the tabs securely against the handle of the electronic thermometer. After the thermometer has been inserted, the cover strips are peeled away along with the selvage of the inner two strips outside the tear seal line and the cover strips are snapped away from the tabs along the perforated lines.

3 Claims, 4 Drawing Figures

THERMOMETER SHEATH PACKAGE FOR ELECTRONIC THERMOMETERS

BACKGROUND OF THE INVENTION

This invention relates to thermometer sheath packages and more particularly to a thermometer sheath package designed for use with electronic thermometers having varying shapes.

A thermometer sheath package, invented by the inventor of this invention, is disclosed in U.S. Pat. No. 3,552,558. This prior sheath package invention was improved with improvement inventions disclosed in U.S. Pat. Nos. 3,732,975, 4,136,776 and 4,165,000. As disclosed in these patents, these prior sheath packages comprise two inner flexible strips of thermoplastic material, which are sandwiched between two paper cover strips having their inner surfaces coated with thermoplastic material. The two inner strips and the outer cover strips are all sealed together along a seal line in the form of a sheath shaped to fit over a clinical thermometer. The two inner strips are sealed together along the seal line in a tear seal and this tear seal defines the thermometer sheath. The two outer cover strips are sealed to the inner strips along the seal line in peelable seals. The cover strips are also sealed to the inner strips over broad flat seal areas at the mouth of the sheath and one of the cover strips is sealed to the adjacent inner strip outside the toe of the sheath in a broad flat seal. To use a sheath, thermometer is inserted into the open mouth of the sheath between the two cover strips and then the cover strips are peeled away with the thermometer within the sheath. The action of peeling the cover strips away tears away the selvage of the inner two strips outside the tear seal line and leaves the sheathed thermometer ready for use for taking the temperature of a patient. In the latest versions of the sheath, as disclosed in U.S. Pat. Nos. 4,165,000 and 4,136,776, perforations are provided across the cover strips at the mouth of the sheath, so as to define tabs in the cover strips outside the mouth of the sheath. When the cover strips are peeled away, they are snapped from the tabs along the perforated lines to leave the tabs remaining as a handle to grasp and the sheathed thermometer.

The above-described thermometer sheath packages have proved to be very convenient to use and very effective for both glass thermometer and electronic thermometers which have probes in the general shape of a clinical glass thermometer. However a new type of electronic thermometer is now being marketed employing a short stubby tapering probe mounted on an enlarged handle, which contains the electronic circuitry and digital readout for the temperature reading. The above-described, previously developed sheath packages are not suitable for use on these new electronic thermometers, because of their shape. It is important for the probe to be inserted all the way to the toe of the sheath, in order for the sheath to be worked properly, and in the previous sheath packages, the sheath is too long. In addition, the sheath of the prior sheath packages is too narrow at the top to accomodate the tapering probe. Moreover, the embodiment disclosed in U.S. Pat. No. 4,136,776 cannot be used because in this embodiment, the two tab portions are joined together with side seals, which do not accomodate the enlarged handle portions of the stubby electronic thermometers. If the side seals are not provided in the tear tab portion, as is the case in the embodiment disclosed in U.S. Pat. No. 4,165,000, the sheath can be modified to accomodate the stubby electronic thermometer by shortening the sheath and by flaring the sheath widely as the seal line of the sheath approaches the mouth. However, in this arrangement the tear tabs will flap loosely against the thermometer handle making them less convenient to use. In addition, the shortness of such a sheath with its wide tapering mouth would tend to make it fall easily from the thermometer. Moroever, the different thermometer sheaths have different perimeters and to accomodate all different embodiments, the mouth of the sheath should be made of a size so that some of the wider probes, upon being inserted fully into the sheath, strain the material of the sheath at the mouth slightly. This straining action will tend to cause the tabs to fall away from the sheath.

SUMMARY OF THE INVENTION

The present invention solves these problems by providing a thermometer sheath package, which can be used effectively and conveniently with the stubby electronic thermometers. In accordance with the present invention, the sheath is shortened and flared widely at the mouth so that the short stubby thermometers can be readily inserted into the sheath. In addition, instead of ending the mouth of the sheath at the perforated lines, the seal line defining the sheath is extended a short distance above the perforated lines into the area of the tear tab where the cover strips are sealed to the inner strips with broad flat seals. This structure means that all four strips are sealed together in the tear tabs at the perimeter of the mouth of the sheath for a short distance above the perforated lines defining the tear tabs. This arrangement allows the probe of the stubby electronic thermometer to be readily fully inserted into the flared sheath with the handle of the electronic thermometer being inserted between and tending to separate the tabs. Because the tabs are joined together by the sheath seal line at the mouth of the seal, the tabs press against the handle and hold the sheath securely on the probe. If the flare of the thermometer probe is such that the mouth of the sheath must be stretched to receive the probe, the tabs will nevertheless stay on the sheath because all four strips are securely joined together along the tear seal line within the tabs. For those thermometers in which the probe tapers to a girth smaller in size than the mouth of the sheath, the tabs of the cover of the strips nevertheless hold the mouth of the sheath in a taut configuration and the taut mouth of the sheath presses the tabs against the handle of the thermometer to hold the sheath firmly in position on the probe.

Accordingly an object of the present invention is to provide a thermometer sheath package suitable for use on electronic thermometers of the stubby variety with the electronics and the temperature display integrated within the handle of the thermometer.

A further object of the present invention is to provide a sheath package for the stubby variety of the electronic thermometer, which sheath package will remain securely in place on the thermometer after the thermometer has been inserted into the sheath.

A further object of the present invention is to provide a thermometer sheath package for electronic thermometers of the stubby variety, which sheath package will accomodate such electronic thermometers with varying tapers for the probes of the thermometers.

Further objects and advantages of the present invention will become readily apparent as the following detailed description of the invention unfolds, and when taken in conjunction with the drawings.

DESCRIPTION OF A SPECIFIC EMBODIMENT

Figure 1:
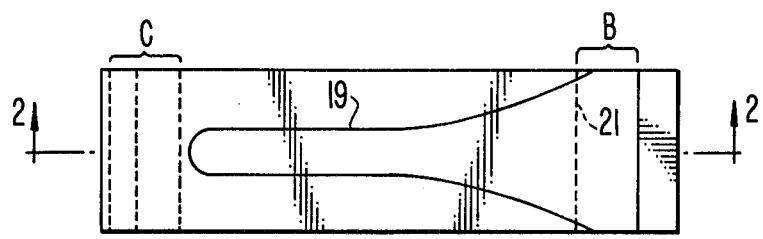
FIG. 1 is a plan view of the thermometer sheath package of the present invention.
Figure 2:
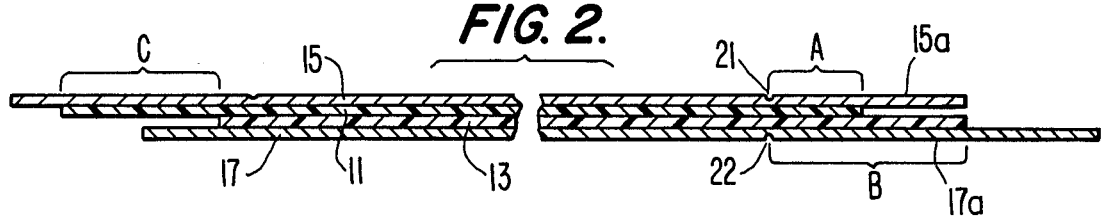
FIG. 2 is an enlarged sectional view of the sheath package of FIG. 1 taken along the line 2—2.

As shown in FIGS. 1 and 2, the sheath package of the present invention comprises two inner strips 11 and 13 of thermoplastic heat sealable material such as ethylmethylacrylate. The two inner strips 11 and 13 are sandwiched between two paper cover strips 15 and 17. The inner surfaces of the cover strips 15 and 17 are preferably coated by a light coating of thermoplastic material such as ethylmethylacrylate. This coating is not shown in FIG. 2 since it impregnates into the strips 15 and 17 and is not visible in viewing the surface of the paper. All four strips 11, 13, 15, and 17 are sealed together along a seal line 19 in the shape of a thermometer sheath. The strips 11 and 13 are joined together along the seal line 19 by a tear seal and are joined to the cover strips 15 and 17 by a peelable seal. The tear seal and the peelable seals along the seal line 19 are formed in one sealing step by an appropriate dye, as is known in the art, and as is described in the applicant's prior patents mentioned above. The tear seal between the strips 11 and 13 along the seal line 19 defines the sheath to enclose the probe of the electronic thermometer. Because the thermometer probes flare to have increased girths near the handle, the seal line 19 is flared to accomodate the increased girth. Specifically the portions of the seal line 19 near the closed toe of the sheath are parallel and about midway between the toe and the open mouth of the sheath, the seal line 19 begins curving outwardly to define a wide flare at the mouth of the sheath.

The top and bottom cover strips 15 and 17 are weakened by perforations along perforation lines 21 and 22 respectively in alignment with each other near the mouth of the sheath defined by the seal line 19. The perforation lines define tabs 15a and 17a in the cover strips 15 and 17 at the mouth of the sheath. An area A of the cover strip 15 is sealed to the inner strip 11 in a broad flat seal. The area A over which the strips 11 and 15 are sealed together extends across the width of the strip and from the perforation line 21 to the end of the strip 11. The cover strip 13 is sealed to the strip 17 in a broad flat seal over an area B. The area B over which the strips 13 and 17 are sealed together extends across the width of the strips 13 and 17 and from the perforation line 22 in the strip 17 to the end of the strip 13. In addition, the cover strip 15 is sealed to the inner strip 11 in a broad flat seal outside the end of the toe of the seal line 19 over an area C. The area C extends across the width of the strips 11 and 15 and from the end of the strip 11 to about the end of the strip 13.

In accordance with the present invention, the seal line 19 along which the inner strips 11 and 13 are joined together in a tear seal and along which the cover strips 15 and 17 are joined to the inner strips extends up past the perforation line 21 and into the areas A and B. In accordance with the preferred embodiment, the seal line 19 extends into the area A and B about 1/16".

Figure 3:
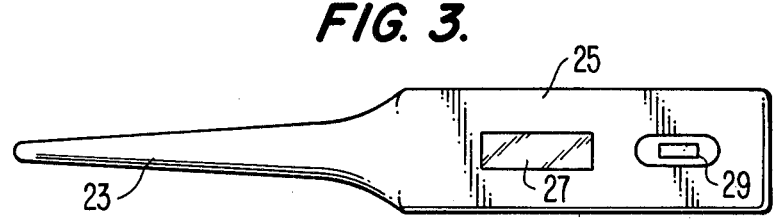
FIG. 3 is a plan view of an electronic thermometer of the type for which the sheath package in FIGS. 1 and 2 is designed.
Figure 4:
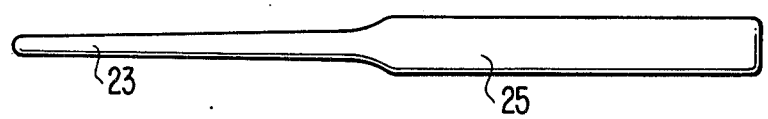
FIG. 4 is a side view in elevation of the electronic thermometer, shown in FIG. 3.

The sheath package of FIGS. 1 and 2 is designed for use on an electronic thermometer, as shown in FIGS. 3 and 4. As shown in these Figures, the electronic thermometer has a short probe 23, which is mounted on an enlarged handle 25, which contains the electronics of the electronic thermometer as well as a window 27, which displays the sensed temperature digitally. To us the thermometer, the probe 23 is placed in the patient's mouth or other body cavity and is activated by actuating a button 29 on the handle. Then after a delay, the temperature will be displayed in the window 27.

As shown in FIGS. 3 and 4, the probe 23 tapers so that it has a much wider girth at the point where it joins the handle 25. To use the thermometer, it is inserted into the open mouth of the sheath defined in the strips 11 and 13 by the tear seal along the seal line 19 while the sheath is still shielded by the cover strips 15 and 17. The flared end of the sheath 19 will accomodate the flare of the probe 23. The girth of the handle 25 is greater than the width of the sheath package so when the probe is inserted fully into the sheath 19, the handle 25 forces the tabs of the cover strips 15a and 17a apart from one another. However, all four strips are retained joined together in the tabs 15a and 17a at the mouth of the sheath and along the portion of the seal line 19, which extends into the areas A and B of the tabs. The joining of all four strips together in the area of the flat seals causes the tabs 15a and 17a to be pressed against the handle 25 and to securely hold the sheath defined by the seal line 19 on the probe. After the probe has been inserted in the manner described above, the cover strip 15 is peeled back and snapped away from the tab 15a along the perforated line 21. As the cover strip 15 is peeled back, it tears the selvage of the strips 11 and 13 away from the sheath along the tear seal of the seal line 19 leaving the sheathed thermometer. The cover strip 17 is then peeled away and snapped off at the perforated line 22 leaving the tab 17a.

The sheath package, as described above thus provides a convenient and effective package for electronic thermometers of the short stubby variety and is useful and convenient to use for different electronic thermometers of this type having varying shapes for the probes. Because the four strips of the package are joined together along the seal line 19, which extends into the tab areas of the cover strips where the cover strips are sealed to the inner strips in broad flat seals, the sheath is retained securely on the electronic thermometer and there is no danger of the tabs coming loose from the mouth of the sheath.

The above description is of a preferred embodiment of the invention and modification may be made thereto without departing from the spirit and scope of the invention, which is defined in the appended claims.

What is claimed is:

1. A thermometer sheath package comprising a pair of inner strips of flexible thermoplastic material, a pair of flexible cover strips sandwiching said inner strips, said strips being sealed together along a seal line to form a tear seal between said inner strips and a peelable seal between said cover strips and said inner strips, said seal line being shaped so that said tear seal in said inner strips defines a thermometer sheath from said inner strips adapted to fit over the probe of an electronic thermometer, said cover strips having weakened lines defined therein extending across said paper strips adjacent to the mouth of said sheath to define tabs in said cover strips adjacent said mouth, said cover strips being sealed to said inner strips in flat seals in areas extending across said paper strips adjacent to said weakened lines and on the opposite side of said weakened lines from the toe of said sheath, said seal line defining the mouth of said sheath extending across said weakened lines and into said flat seal areas whereby said tabs will be pressed against a handle of an inserted electronic thermometer to hold the sheath securely in position on a probe of the electronic thermometer for electronic thermometers with different girths at the mouth of said sheath.

2. A thermometer sheath package, as recited in claim 1, wherein said tear seal line extends into said flat seal areas about 1/16".

3. A thermometer sheath package, as recited in claim 1, wherein said tear seal line is shaped to provide parallel sides to the said sheath near said toe of said sheath and curves outwardly from a point on said sheath about midway between said toe and said mouth of said sheath to define a flared opening for said sheath.

* * * * *